United States Patent
Bychkov et al.

(10) Patent No.: US 8,738,060 B2
(45) Date of Patent: *May 27, 2014

(54) METHOD AND SYSTEM FOR CIRCULATING MESSAGES

(71) Applicant: Google Inc., Mountain View, CA (US)

(72) Inventors: Eyal Bychkov, Hod Hasharon (IL); Uri Ron, Kfar Saba (IL); Tal Engelstein, Ramat Gan (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/949,811

(22) Filed: Jul. 24, 2013

(65) Prior Publication Data

US 2013/0316747 A1    Nov. 28, 2013

Related U.S. Application Data

(62) Division of application No. 12/325,210, filed on Nov. 30, 2008, now Pat. No. 8,526,988.

(51) Int. Cl.
*H04B 7/15*        (2006.01)
*H04B 3/36*        (2006.01)
*H04B 7/14*        (2006.01)

(52) U.S. Cl.
USPC .............. 455/518; 455/13.1; 455/11.1; 455/7

(58) Field of Classification Search
CPC .............. H04B 7/15; H04B 3/36; H04B 7/14; H04L 2463/103; H04L 29/06027; H04L 63/083; H04L 63/10; H04L 65/4072
USPC ..................... 455/518, 11.1, 13.1, 7
See application file for complete search history.

(56) References Cited

U.S. PATENT DOCUMENTS

| | | | | |
|---|---|---|---|---|
| 5,287,356 | A | * | 2/1994 | Parkhideh ...................... 370/445 |
| 5,414,833 | A | * | 5/1995 | Hershey et al. .................. 726/22 |
| 5,418,785 | A | * | 5/1995 | Olshansky et al. ............ 370/438 |
| 5,628,055 | A | | 5/1997 | Stein |
| 5,680,589 | A | * | 10/1997 | Klingman ....................... 703/23 |

(Continued)

FOREIGN PATENT DOCUMENTS

| | | |
|---|---|---|
| EP | 1871075 A1 | 12/2007 |
| WO | 0059247 A1 | 10/2000 |
| WO | 0186922 A1 | 11/2001 |
| WO | 03103174 A1 | 12/2003 |

OTHER PUBLICATIONS

3jam SuperText is your free message inbox on the web; http://www.3jam.com/.
Send'm; http://www.sendm.biz/.

*Primary Examiner* — Bobbak Safaipour
(74) *Attorney, Agent, or Firm* — Soquel Group LLC

(57) ABSTRACT

A method for circulating a message to a group of people, including sending a circulated message and a distribution list comprising identifiers for a plurality of mobile communicators, by a first mobile communicator, and sequentially receiving the circulated message and a distribution list, by a next mobile communicator, and, if the received distribution list is non-empty, then (i) selecting one of the mobile communicators identified in the distribution list, (ii) modifying the distribution list by removing the identifier of the selected mobile communicator therefrom, and (iii) sending the circulated message and the modified distribution list to the selected mobile communicator.

14 Claims, 8 Drawing Sheets

(56) References Cited

U.S. PATENT DOCUMENTS

| | | |
|---|---|---|
| 6,201,867 B1 | 3/2001 | Koike |
| 6,243,578 B1 | 6/2001 | Koike |
| 6,516,202 B1 | 2/2003 | Hawkins et al. |
| 6,690,947 B1 | 2/2004 | Tom |
| 6,898,283 B2 | 5/2005 | Wycherley et al. |
| 6,999,792 B2 | 2/2006 | Warren |
| 7,085,542 B2 | 8/2006 | Dietrich et al. |
| 7,085,577 B1* | 8/2006 | Katsuno et al. ............ 455/456.3 |
| 7,194,285 B2 | 3/2007 | Tom |
| 7,266,391 B2 | 9/2007 | Warren |
| 7,310,683 B2* | 12/2007 | Shobatake .................. 709/238 |
| 8,150,429 B1* | 4/2012 | Zheng ........................ 455/466 |
| 2001/0039181 A1* | 11/2001 | Spratt ........................ 455/11.1 |
| 2003/0031308 A1* | 2/2003 | Lim ........................... 379/221.1 |
| 2003/0061389 A1* | 3/2003 | Mazza ........................ 709/248 |
| 2004/0230752 A1* | 11/2004 | Blake et al. ................ 711/147 |
| 2004/0233930 A1 | 11/2004 | Colby, Jr. |
| 2005/0033852 A1* | 2/2005 | Tenhunen ................... 709/229 |
| 2005/0070225 A1 | 3/2005 | Lee |
| 2005/0078660 A1* | 4/2005 | Wood ........................ 370/352 |
| 2005/0159184 A1 | 7/2005 | Kerner et al. |
| 2005/0256928 A1* | 11/2005 | Yuan et al. ................. 709/206 |
| 2006/0013584 A1* | 1/2006 | Miyazaki .................... 398/19 |
| 2006/0019636 A1* | 1/2006 | Guglielmi et al. ......... 455/412.1 |
| 2006/0040610 A1* | 2/2006 | Kangas ...................... 455/3.06 |
| 2006/0105722 A1 | 5/2006 | Kumar |
| 2006/0190321 A1 | 8/2006 | Martins Nicho et al. |
| 2006/0241353 A1 | 10/2006 | Makino et al. |
| 2007/0004450 A1 | 1/2007 | Parikh |
| 2007/0018957 A1 | 1/2007 | Seo |
| 2007/0081461 A1* | 4/2007 | Denecheau et al. ......... 370/231 |
| 2007/0161404 A1 | 7/2007 | Yasujima et al. |
| 2008/0026794 A1 | 1/2008 | Warren |
| 2008/0140886 A1 | 6/2008 | Izutsu |
| 2008/0219155 A1* | 9/2008 | Shitano ...................... 370/226 |
| 2008/0287150 A1* | 11/2008 | Jiang et al. ................. 455/466 |
| 2009/0180492 A1* | 7/2009 | Hu ............................. 370/462 |
| 2010/0064001 A1* | 3/2010 | Daily ......................... 709/203 |
| 2010/0136948 A1* | 6/2010 | Bychkov et al. ........... 455/406 |
| 2010/0304727 A1* | 12/2010 | Agrawal et al. ............ 455/414.3 |

* cited by examiner

METHOD AND SYSTEM FOR CIRCULATING MESSAGES

CROSS REFERENCE TO RELATED APPLICATIONS

This application is a divisional of assignee's co-pending application U.S. Ser. No. 12/325,210, entitled MESSAGE AND SYSTEM FOR CIRCULATING MESSAGES, and filed on Nov. 30, 2008 by inventors Eyal Bychkov, Uri Ron and Tal Engelstein.

FIELD OF THE INVENTION

The present invention relates to wireless communication, and in particular to wireless messaging.

BACKGROUND OF THE INVENTION

Mobile communication devices, such as cell phones, personal digital assistants (PDAs) and laptop computers, are very widespread, and have become an essential part of modern life. Such devices generally communicate via voice or instant messages. Most instant messages use the Short Message Service (SMS) protocol for sending text messages, but other messages, such as Multimedia Messaging Service (MMS) messages, are also very much in use. According to http://en.wikipedia.org/wiki/Short_message_service, currently 2.4 billion active users around the world, which is roughly 74% of all mobile phone subscribers, send and receive text messages on their phones.

The SMS Point-to-Point protocol (SMS-PP) is defined in GSM Recommendation 3.40*. Messages are sent to a Short Message Service Center (SMSC), which provides store-and-forward functionality, for transmission to recipients. SMSC supports mobile-terminated (MT) functionality, for messages sent to a mobile handset, and supports mobile-originating (MO) functionality, for messages sent from a mobile handset.

Transmission of messages from the SMSC to a recipient mobile handset is in conformance with the Mobile Application Part (MAP) of the SS7 protocol. In particular, messages are sent using the MAP ForwardSM operations, which limits the length of messages to 140 octets; i.e., 1,120 bits. Routing data and other metadata is added to the message, beyond the 1,120 bit limit.

SMS messaging supports two modes; namely, text and data. For text mode, the message uses the default GSM 7-bit alphabet for regular text messages, supporting 70 characters; and uses 16-bit UCS-2 character encoding for languages such as Arabic, Chinese, Korean, Japanese, and for Cyrillic alphabet languages such as Russian, supporting 160 characters. For data mode, the message uses 8-bit characters and supports 140 characters. Data mode supports inter alia the following services.

WAP Push, which is an encoded message that includes a link to a WAP or WWW address. WAP Push enables WAP content to be pushed to a mobile handset with minimal user intervention. A Push Proxy Gateway (PPG) processes WAP Pushes and delivers them over an IP or SMS bearer.

OTA Settings, which relate to setup of new services, such as GPRS, MMS and Instant Messaging, for a subscriber of a mobile phone network.

MMS Notification, which indicates when a new MMS messages has been received on the Multimedia Messaging Service Center (MMSC). Depending on the phone settings, the message may be automatically downloaded from the MMSC, if a GPRS or UMTS connection is available.

Push E-mail, for receiving e-mail messages on a mobile handset.

A drawback with SMS messaging is the relatively high cost. According to a recent study from the University of Leicester, http://www.spacemart.com/reports/SMS_Texting_Costs_Are_Out_Of_Thi s_World_999.html, sending text messages by mobile phones is far more expensive than downloading data from the Hubble Space Telescope. Operators charge subscribers per SMS text message, or offer SMS plans, such as unlimited SMS texting for a fixed monthly rate. For some plans, pricing is different for messages sent within a network or within a pre-defined group, than for messages outside of the network or group.

Costs for instant messaging generally comprise a significant portion of subscribers' monthly fees. The expense is often excessive, since many subscribers perceive sending of text messages as being inexpensive, and much cheaper than phone calls.

A factor that contributes to excessive messaging expenses is the distribution of messages to a group of friends. Often a subscriber broadcasts messages to his friends notifying them of events, or about his status. E.g., if the friends wish to go to a movie together, the subscriber may send a message notifying them of the time and place. Messaging applications, such as 3jam developed by 3jam, Inc. of San Francisco, Calif., and Send'm developed by SEND-M, Ltd. of Or Yehuda, Israel, enable users to send a message to a group of friends. Generally, each member of the group knows which group members are on the mailing list, and may reply to some or all of the group members.

A disadvantage of sending of group messages using conventional technology is that the subscriber who initiates the message must bear the entire cost of the communication. Another disadvantage of sending of group messages using conventional technology is that the initiator of the message does not know whether the recipients actually received the message.

SUMMARY OF THE DESCRIPTION

Aspects of the present invention overcome these disadvantages described above, by providing methods and systems (i) for sharing the expenses of distributing messages among members of a group, using mobile communicators, and (ii) for ensuring that the initiator of the message receives a confirmation if the message was successfully distributed to all members of the group. As used herein, the term mobile communicator refers to an electronic device that sends and receives data over a wireless communication network. A mobile communicator includes inter alia a cell phone, a portable data assistant (PDA), a laptop computer, and other such devices that include modems. As used herein, the term message refers to data that is transmitted from a first person to a second person. A message includes inter alia a text message, a multimedia message, an e-mail message and a voice message. A message may be informational, such as notification of an event, or may additionally solicit a response or a vote from each recipient.

In one embodiment of the present invention, a member of a group is able to distribute a message among other members of the group by specifying the group as being the recipient of the message. The message is then automatically circulated among the members of a group according to a routing order.

The message is received and forwarded by one member to another, until the message has completed a traversal through the entire group.

Embodiments of the present invention address the creation of groups, and the determination of one or more routing orders for circulating messages among the group.

Embodiments of the present invention further address overcoming problems when one or more of the members of the group are inaccessible.

There is thus provided in accordance with an embodiment of the present invention a method for circulating a message to a group of people, including sending a circulated message by a $1^{st}$ mobile communicator, and sequentially receiving the circulated message by an $n^{th}$ mobile communicator and sending the circulated message to an $(n+1)^{st}$ mobile communicator, $n=2, 3, \ldots, N-1$, wherein each one of the N mobile communicators has a distinct phone number.

There is additionally provided in accordance with an embodiment of the present invention a communication system, including a plurality of N mobile communicators, each having a distinct phone number, and circuitry in each of the plurality of mobile communicators, (i) for sending a circulated message by the $1^{st}$ mobile communicator, and (ii) for sequentially receiving the circulated message by the $n^{th}$ mobile communicator and sending the circulated message to the $(n+1)^{st}$ mobile communicator, $n=2, 3, \ldots, N-1$.

There is further provided in accordance with an embodiment of the present invention a method of communication, including receiving a circulated message, by a destination mobile communicator, from a previous destination mobile communicator, and sending the circulated message to a next destination mobile communicator, where the previous destination mobile communicator, the destination mobile communicator and the next destination mobile communicator are successive members of an ordered list of mobile communicators, if the destination mobile communicator is not the last member of the ordered list.

There is yet further provided in accordance with an embodiment of the present invention a destination mobile communicator, including a modem for sending and receiving messages, a memory for storing a group of identifiers of mobile communicators, and an ordered list thereof, and modem controller circuitry communicatively coupled with the modem and with the memory, for controlling the modem (i) to receive a circulated message from a previous destination mobile communicator, and (ii) to send the circulated message to a next destination mobile communicator, where the previous destination mobile communicator, the destination mobile communicator and the next destination mobile communicator are successive members of the ordered list of mobile communicators stored in the memory, if the destination mobile communicator is not the last member of the ordered list.

There is moreover provided in accordance with an embodiment of the present invention a method of billing subscribers to a communication service, including identifying a message that was distributed to members of a pre-defined group of subscribers, further identifying all transmissions of the distributed message from one member of the group to another member of the group, as the distributed message traversed all members of the group, and allocating the total cost of the identified transmissions equally among the members of the group.

There is additionally provided in accordance with an embodiment of the present invention a billing system for subscribers to a communication service, including an activity monitor (i) for identifying a message that was distributed to members of a pre-defined group of subscribers, and (ii) for further identifying all transmissions of the distributed message from one member of the group to another member of the group, as the distributed message traversed all members of the group; and a billing manager, coupled with the activity monitor, for allocating the total cost of the identified transmissions equally among the members of the group.

There is further provided in accordance with an embodiment of the present invention a method for circulating a message to a group of people, including sending a circulated message and a distribution list including identifiers for a plurality of mobile communicators, by a first mobile communicator, and sequentially receiving the circulated message and a distribution list, by a next mobile communicator, and, if the received distribution list is non-empty, then (i) selecting one of the mobile communicators identified in the distribution list, (ii) modifying the distribution list by removing the identifier of the selected mobile communicator therefrom, and (iii) sending the circulated message and the modified distribution list to the selected mobile communicator.

There is yet further provided in accordance with an embodiment of the present invention a communication system, including a plurality of mobile communicators, and circuitry in each of the plurality of mobile communicators, (i) for sending a circulated message and a distribution list comprising identifiers for a plurality of mobile communicators, and (ii) for successively receiving the circulated message and a distribution list, by a next mobile communicator, and, if the received distribution list is non-empty, then (ii.a) selecting one of the mobile communicators identified in the distribution list, (ii.b) modifying the distribution list by removing the identifier of the selected mobile communicator therefrom, and (ii.c) sending the circulated message and the modified distribution list to the selected mobile communicator.

There is moreover provided in accordance with an embodiment of the present invention a method for creating a group of mobile communicators, including sending an invitation from an originator mobile communicator to a plurality of other mobile communicators, receiving responses from the plurality of other mobile communicators, the responses indicating acceptance or non-acceptance of the invitation, creating group information including (a) identifiers of group members, the group members including the mobile communicators from which responses indicating acceptance of the invitation were received, and (b) an ordered list of the group members for use in circulating messages among the group members, and sending the group information to the group members.

There is additionally provided in accordance with an embodiment of the present invention a communication system, including a plurality of mobile communicators, and circuitry in each of the plurality of mobile communicators, (i) for sending an invitation from such mobile communicator to the other mobile communicators, (ii) for receiving responses from the other mobile communicators, the responses indicating acceptance or non-acceptance of the invitation, (iii) for creating group information including (a) identifiers of group members, the group members including the mobile communicators from which responses indicating acceptance of the invitation were received, and (b) an ordered list of the group members for use in circulating messages among the group members, and (iv) for sending the group information to the group members.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to distributing messages to members of a group using wireless communicators. In one embodiment, a member of a group distributes a message among the other members of the group by designating the group as being the recipient of the message, when sending the message. The message is then routed in a specific routing order, from one member of the group to the next, until the message has circulated through the entire group.

In terms of billing, since each member is billed for sending the message to the next member, the cost of distributing the message to the group is automatically shared among the members of the group.

In accordance with an embodiment of the present invention, each of the members' mobile communicators has circuitry therein that is programmed to receive a message being circulated and automatically send it to a next mobile communicator.

Figure 1:
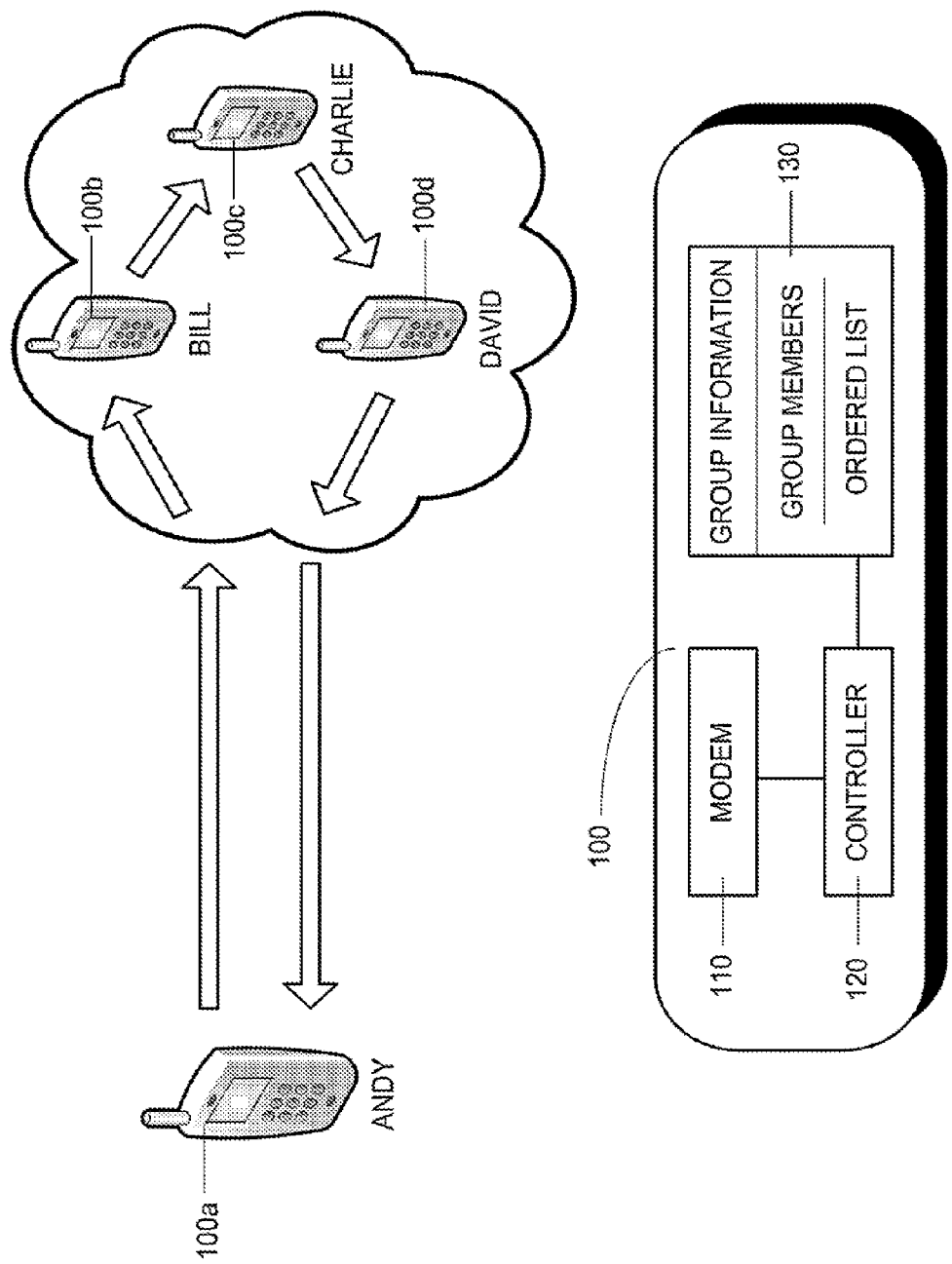
FIG. 1 is a simplified diagram of a system for circulating a message among members of a group of mobile communicators, in accordance with an embodiment of the present invention.

Reference is now made to FIG. 1, which is a simplified diagram of a system for circulating a message among members of a group of mobile communicators, in accordance with an embodiment of the present invention. Shown in FIG. 1 is a group of four mobile communicators, corresponding to users Andy, Bill, Charlie and David, and denoted respectively 100a, 100b, 100c and 100d. Also shown in FIG. 1 is a simplified block diagram of a general mobile communicator 100, which includes a modem 110, a controller 120 and a memory 130. Controller 120 includes circuitry for controlling modem 110 to send and receive messages. Memory 130 stores data including inter alis identifiers of group members, such as Andy, Bill, Charlie and David, and a representation of an ordered list of the members, such as Andy→Bill→Charlie→David.

When Andy's mobile communicator sends a message for circulation among the group, the message is automatically routed from Andy→Bill→Charlie→David. Each mobile communicator has sufficient information to identify the recipient to whom it must forward the message that it receives. Upon receipt of the message, David's mobile communicator, being the last member in the routing order, sends a status report to Andy's mobile communicator confirming receipt of the circulated message. Upon receipt of the status report, Andy knows that his message was successfully distributed to all members of the group.

It will be appreciated by those skilled in the art that the cost of circulating the message among the group is automatically shared among the members of the group. Andy is billed for the message sent from Andy to Bill. Bill is billed for the message sent from Bill to Charlie. Charlie is billed for the message sent from Charlie to David. David is billed for the status report sent from David to Andy. In distinction, had Andy sent the message to each of the members of the group using conventional technology, then Andy would be billed for sending three messages, and Bill, Charlie and David would not be billed at all.

Figure 2:
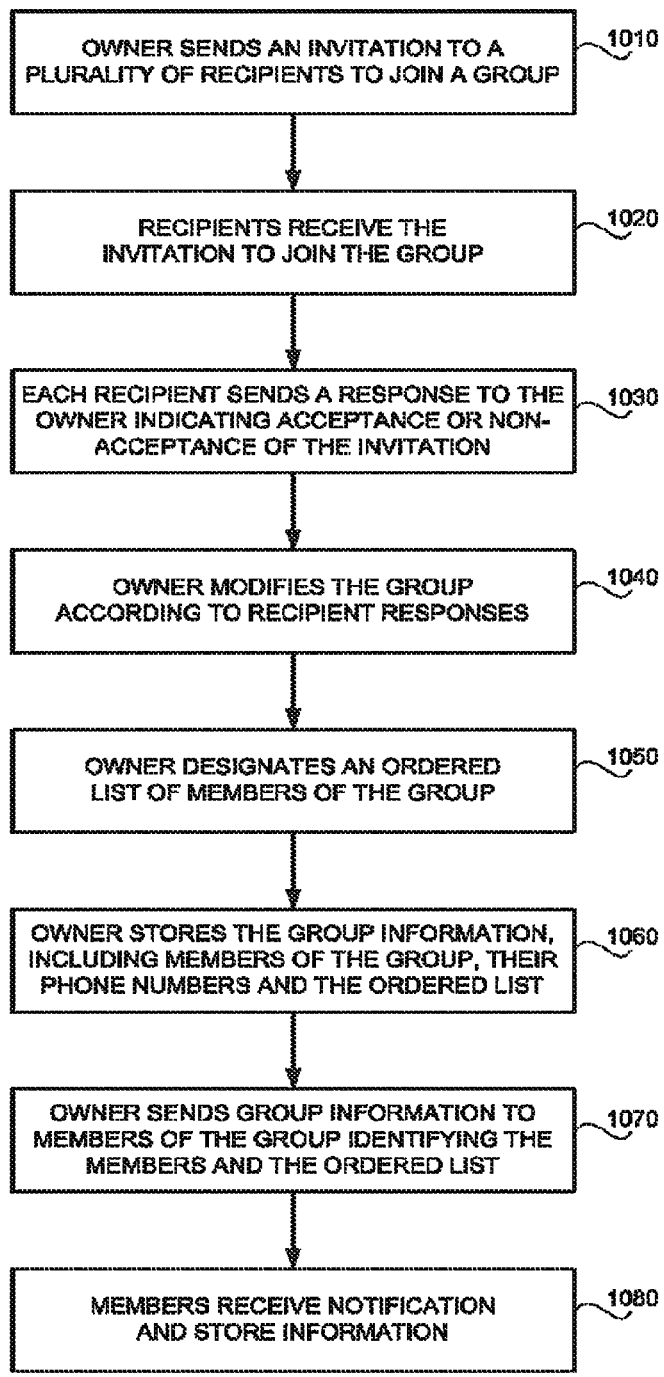
FIG. 2 is a simplified flowchart of a method for creating a group of mobile communicators for message circulation, in accordance with an embodiment of the present invention.

Reference is now made to FIG. 2, which is a simplified flowchart of a method for creating a group of mobile communicators for message circulation, in accordance with an embodiment of the present invention. At step 1010 a subscriber, referred to as the owner of the group, sends an invitation to a plurality of recipients to join a group. The invitation is sent from the owner's mobile communicator to each of the recipients' mobile communicators. At step 1020 the recipients receive the invitation to join the group.

At step 1030 each recipient sends a response to the owner indicating acceptance or non-acceptance of the invitation. The response is sent from the recipients' mobile communicators to the owner's mobile communicator. At step 1040 the owner modifies the group according to the recipient responses, thereby defining the members of the group; namely, those recipients who accepted the invitation. The recipients who opted out are not included as members of the group.

At step 1050 the owner designates an ordered list of the members of the group. The list determines an ordering, member #1, member #2, . . . , member #N, where N denotes the number of members of the group. In terms of its data representation, the ordered list of members may be represented as a sequence of phone numbers, or as a sequence of pointers to phone numbers, or as such other data structure for representing an ordered list of mobile communicators.

Often it is convenient to endow an ordered list with a circular structure, whereby the last member is connected back to the first member; i.e., 1→2→ . . . →N→1. Any member of the group may then use the circular list, starting from himself, to circulate a message among the other members of the group according to the order of the list. E.g., member #4 may initiate a message to be circulated among the other group members, according to the order 4→5→ . . . →N→1→2→3. Each member's mobile communicator automatically receives the message and sends it to the next member in the list, with member #N sending the message to member #1.

At step 1060 the owner stores the group information, including the members of the group and their phone numbers, and the ordering of the members, in his mobile communicator. At step 1070 the owner sends the group information to the members of the group. At step 1080 the members of the group receive the group information and store the information in their mobile communicators.

At this stage, each mobile communicator has stored therein information identifying the members of the group and the ordering of the members. Thereafter, the owner of the group may edit the group by adding or deleting members, and by changing the ordering of the members. Generally, when the owner edits the group a notification describing the modified group is sent to the members of the group, so that their mobile communicators are synchronized.

By accepting the invitation to join the group at step 1030, each member agrees to share the costs for circulating messages among the group. A member of the group may subsequently decide to remove himself from the group, in which case he sends a message to the owner of the group requesting that he be removed.

In alternative embodiments of the present invention, creation of a group is performed ad-hoc "on-the-fly" when the need to circulate a message among the group arises. In such case, when a member of the ad-hoc group receives the message, he may "accept" the message and agree to forward it to the next member of the group. If the member does not accept, then the initiator receives a notification, in which case he may re-send the message to a modified group, or send the message to the next member following the recipient who opted out, thereby bearing the cost that would have been borne by the recipient who opted out.

Figure 3A:
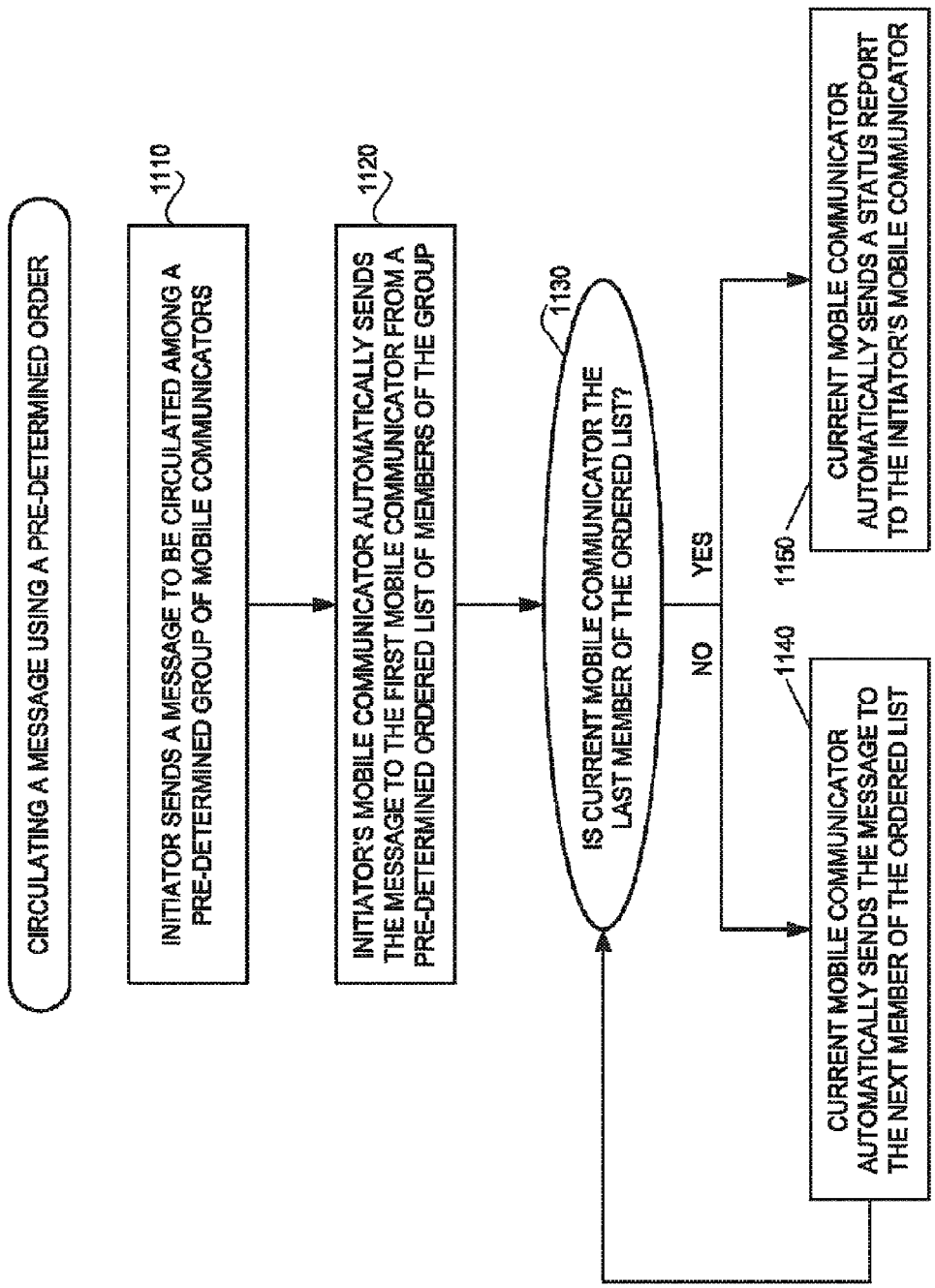
FIG. 3A is a simplified flowchart of a method for circulating a message among a group of mobile communicators according to a pre-determined order, in accordance with an embodiment of the present invention.

Reference is now made to FIG. 3A, which is a simplified flowchart of a method for circulating a message among a group of mobile communicators according to a pre-determined order, in accordance with an embodiment of the present invention. At step 1110 a member of the group, referred to as the message initiator, sends a message to be circulated among a group of members, such as the group created by the method of FIG. 2. The initiator does so by designating the group as being the recipient of the message. The group of members has a pre-determined ordering associated therewith, such as the ordering determined at step 1050. At step 1120 the initiator's mobile communicator automatically identifies the first mobile communicator from the ordered list of members of the group, based on the group information stored in the initiator's mobile communicator, and sends the message to the first mobile communicator.

At step 1130 the current mobile communicator receiving the circulated message consults the group information stored in the current mobile communicator, and determines whether the current mobile communicator is the last member in the ordering of the group members. If not, then the current mobile communicator identifies the next member in the ordering of the members, and at step 1140 sends the circulated message to the next member. The method then returns to step 1130. Otherwise, if the current mobile communicator is the last member of the group, then at step 1150 the current mobile communicator sends a status report to the initiator, indicating that it successfully received the circulated message. Until the initiator receives the status report, he cannot confirm that the message was successfully circulated to all members of the group.

It will be appreciated by those skilled in the art that because each member sends the circulated message to another member, the cost of circulating the message among the group is automatically shared among the members. Each member is billed for the message that he sends to one recipient.

Figure 3B:
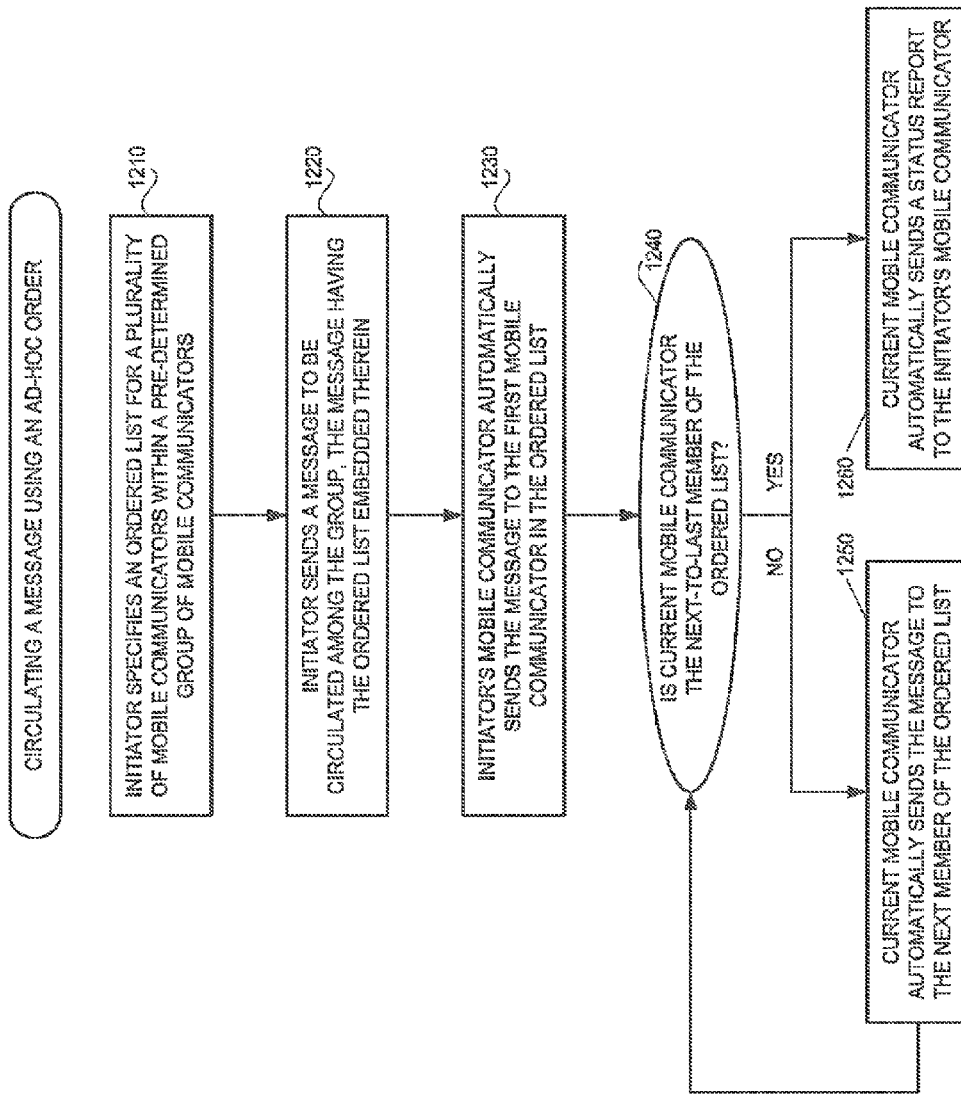
FIG. 3B is a simplified flowchart of a method for circulating a message among a group of mobile communicators according to an ad-hoc order, in accordance with an embodiment of the present invention.

Reference is now made to FIG. 3B, which is a simplified flowchart of a method for circulating a message among a group of mobile communicators according to an ad-hoc order, in accordance with an embodiment of the present invention. In distinction from the method of FIG. 3A which uses a pre-determined order, the method of FIG. 3B uses an ad-hoc order specified by the message initiator. At step 1210 the initiator of the message species an ordered list of members of a group. The initiator of the message is appended at the end of the ordered list, so as to be the last member of the list. E.g., if Andy is the initiator of the list then the list may indicate Bill→Charlie→David→Andy. Alternatively, members of the group may have personal ordered lists of the group members stored in their mobile communicators. For example, as described hereinabove, each member may use a circular list of the group members, starting immediately after himself, as his personal ordered list. Thus for the circular list Andy→Bill→Charlie→David→Andy, Bill's personal ordered list is Charlie→David→Andy→Bill, and Charlie's personal ordered list is David→Andy→Bill→Charlie. In such case step 1210 is obviated and the initiator's personal list is used instead of an ad-hoc list.

At step 1220 the initiator sends a message to the group, by designating the group as the recipient of the message. The initiator's mobile communicator automatically embeds the ordered list within the message. As indicated hereinabove, the ordered list may be represented as a sequence of phone numbers, or as a sequence of pointers to phone numbers, or as such other data structure for representing an ordered list of mobile communicators.

At step 1230 the initiator's mobile communicator automatically sends the list to the first mobile communicator in the list, i.e. Bill's communicator in the example above where Andy is the initiator. At step 1240 the current mobile communicator receiving the message extracts the ordered list in the message to determine if the current mobile communicator is the next-to-last member of the list. If not, the current mobile communicator consults the list to determine the next member, and at step 1250 the current mobile communicator sends the message to the next member. The method then returns to step 1240. Otherwise, if the current mobile communicator is the next-to-last member of the list, then at step 1250 the current mobile communicator sends a status report to the last member of the list; i.e., to the initiator of the list, indicating successful receipt of the message. As above, until the initiator receives the status report, he cannot confirm that the message was successfully circulated to all members of the group.

In an alternative embodiment of the present invention, at step 1250 the current mobile communicator shortens the embedded list by removing himself from the beginning of the list. In this way, less and less data is transmitted as the message circulation advances from member to member. E.g., referring to the example above, after Bill receives the message, his mobile communicator truncates the ordered list to Charlie→David→Andy prior to sending the message to Charlie; and after Charlie receives the message, his mobile communicator truncates the ordered list to David→Andy prior to sending the message to David.

It will be appreciated by those skilled in the art that the message circulated by the methods of FIGS. 3A and 3B may be an informational message, or additionally a message requesting a response or vote from the members of the group. Each member receiving the message may respond or vote according to criteria set by the initiator. E.g., the message may ask whether the member wishes to go to a movie at 9:00 PM, and the initiator may enable a "Yes" and a "No" reply. Each recipient is then presented with the "Yes" and "No" replies. The replies themselves may be sent directly to the initiator. In such case, each recipient sends two messages; namely, the circulated message to the next recipient in the ordered list, and the reply to the initiator. Alternatively, each recipient's reply may be concatenated to the circulated message. In such case, the circulated message grows in length as it circulates through the group members.

One of the challenges with message circulation by the methods of FIGS. 3A and 3B is how to deal with situations where the circulated message does not reach one of the group members. E.g., the member's mobile communicator may be turned off, or the mobile communicator's SMS memory limit may be exceeded.

Figure 4:
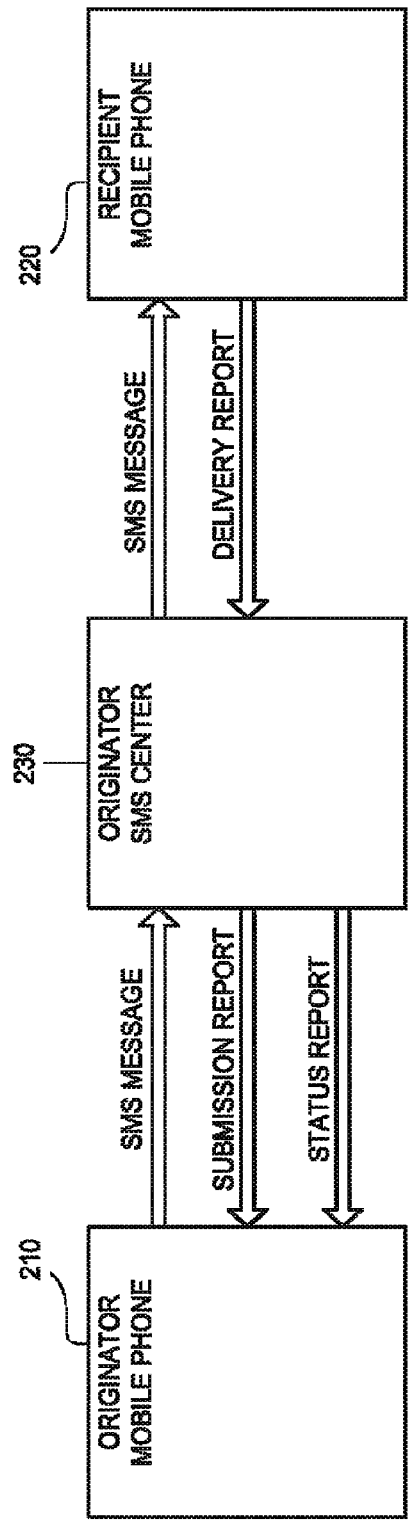
FIG. 4 is a prior art diagram illustrating operation of SMS messaging.

In this regard, reference is made to FIG. 4, which is a prior art diagram illustrating operation of SMS messaging. Shown in FIG. 4 is an originator mobile phone 210, a recipient mobile phone 220 and a short messaging service center 230. Originator mobile phone 210 sends an SMS message to recipient mobile phone 220. The SMS message is transmitted to SMS center 230, for further transmission to recipient mobile phone 220. If recipient mobile phone 220 is inaccessible, the SMS message is temporarily stored in SMS center 230. SMS center 230 sends the message later when recipient mobile phone 220 becomes accessible. A time period, referred to as a validity period, may be specified, after which time the SMS message is deleted from SMS center 230. As such, if recipient mobile phone 220 does not become accessible within the validity period, then the SMS message will not be sent when recipient mobile phone 220 subsequently does become accessible.

A flag may be set in the SMS message to notify SMS center 230 to provide a status report about delivery of the SMS message. The status report is sent to originator mobile phone 210 in the form of an SMS message. When the SMS message sent by originator mobile phone 210 reaches SMS center 230, SMS center 230 sends a submission report back to originator mobile phone 210, as indicated in FIG. 4. The submission report indicates either successful receipt of the SMS message, or failure. Failure may be due to an incorrect SMS message format, or due to SMS center 230 being busy.

If originator mobile phone 210 does not receive the submission report after a designated period of time, it concludes that the submission report was lost, and originator mobile phone 210 may re-send the SMS message. A flag is set in the re-sent SMS message to indicate that the SMS message was sent previously. If the previous submission report was successful, SMS center 230 ignores the re-sent SMS message and sends a submission report to original mobile phone 210, thus avoiding sending of the same SMS message multiple times to recipient mobile phone 220.

When the SMS reaches recipient mobile phone 220, recipient mobile phone 220 sends a delivery report to SMS center 230, as indicated in FIG. 4. The delivery report indicates either successful receipt of the SMS message, or failure. Failure may be due to an unsupported message format, or insufficient free storage space available in recipient mobile phone 220. In turn, SMS center 230 sends a status report to originator mobile phone 210, after receiving the delivery report from recipient mobile phone 220, as indicated in FIG. 4. If SMS center 230 does not receive the delivery report after a designated period of time, it concludes that the delivery report was lost, and re-sends the SMS message to recipient mobile phone 220.

In accordance with an embodiment of the present invention, the owner of a group may set a validity period for the SMS message distributed to the group. After the validity period, the SMS message will not be further distributed.

Further in accordance with an embodiment of the present invention, if the sender of a message to be distributed among group members receives a negative submission report, then the message is re-sent after a pre-defined time, such as 5 minutes. If sending of the re-sent message fails, then the message may be re-sent again, up to a designated maximum number of tries. If the sending of the re-sent message fails for all of the tries, then an error message is sent to the group owner.

If the sender of the message receives a negative status report, then the message is sent to the next recipient in the list of members. E.g., for the list Andy→Bill→Charlie→David, if Charlie's mobile communicator is inaccessible, then Bill's mobile communicator receives a negative status report, and the message is then automatically sent from Bill's mobile communicator to David, with appropriate changes as necessary.

Figure 5:
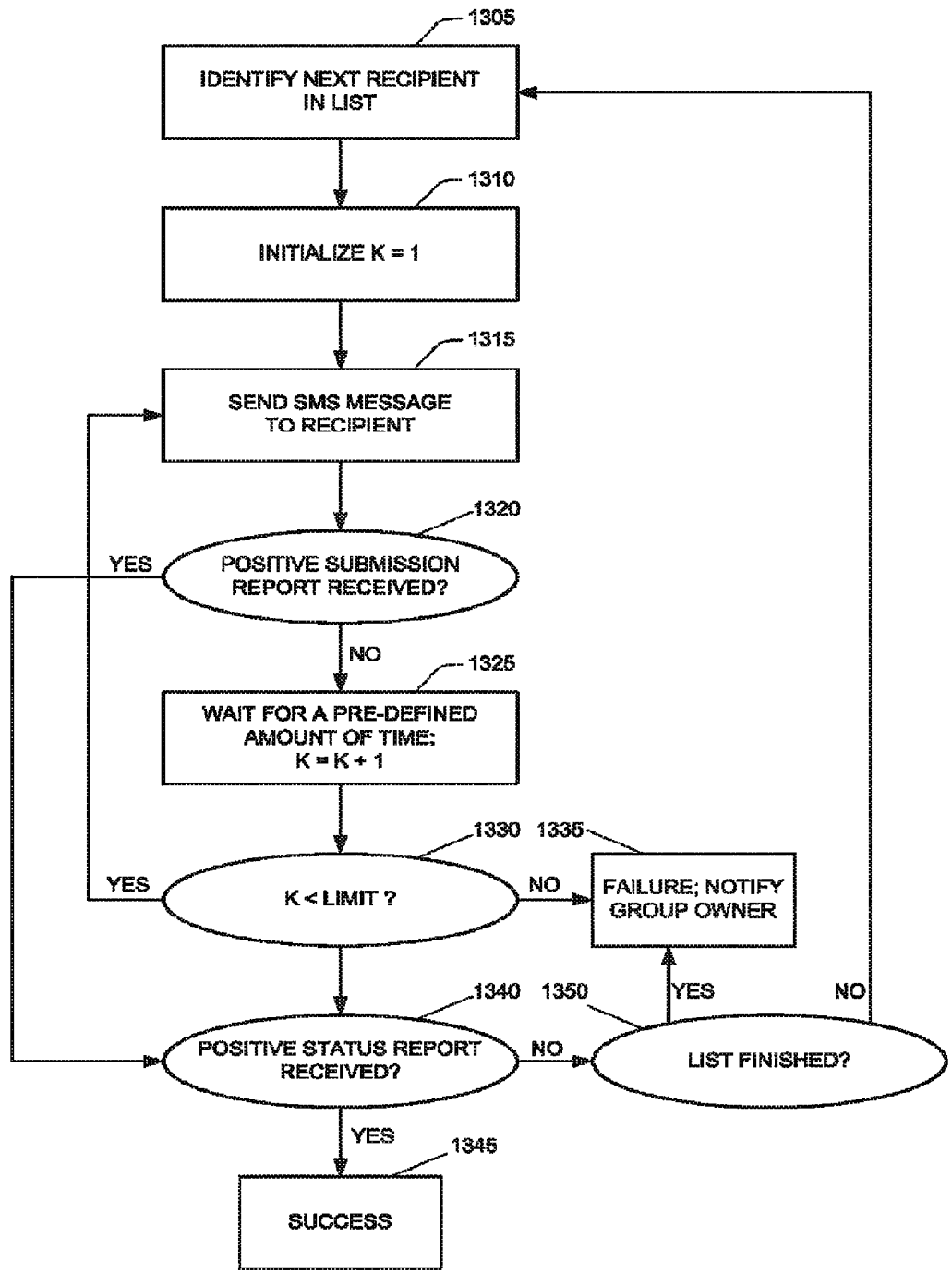
FIG. 5 is a simplified flowchart of a method for a mobile communicator to send an SMS message to a recipient, if message delivery problems arise, in accordance with an embodiment of the present invention.

Reference is now made to FIG. 5, which is a simplified flowchart of a method for a mobile communicator to send an SMS message to a recipient, if message delivery problems arise, in accordance with an embodiment of the present invention. At step 1305, the mobile communicator identifies a next member in the list of members, as a recipient of the SMS message. At step 1310 a counter, K, is initialized to K=1. The counter, K, counts the number of tries to send the SMS message to the recipient identified at step 1305. At step 1315 the mobile communicator tries to send the SMS message to the recipient. At step 1320 a determination is made whether or not a positive submission report is received. If not, then at step 1325 the method waits for a pre-defined amount of time, such as 5 minutes, and the counter, K, is advanced by one. At step 1330 a determination is made whether K has reached the limit on the number of tries. If not, then processing returns to step 1315 where the mobile communicator tries again to send the SMS message to the recipient. If it is determined at step 1330 that K has reached the limit on the number of tries, then the method fails at step 1335 and a notification of failure is sent to the owner of the group.

Referring back to step 1320, if a positive submission report is received, then processing advances to step 1340, where a determination is made whether or not a positive status report is received. If so, then the method ends successfully at step 1345. If not, a determination is made at step 1350 if the recipients identified at step 1305 have exhausted the alternatives for recipients in the list of members. Generally, the alternatives for recipients are those recipients whose positions in the list are after the position of the mobile communicator performing the method of FIG. 5. If the alternative recipients have been exhausted, then the method fails at step 1335 and a notification of failure is sent to the owner of the group. Otherwise, processing returns to step 1305 where a next recipient is identified.

Implementation Details

Figure 6:
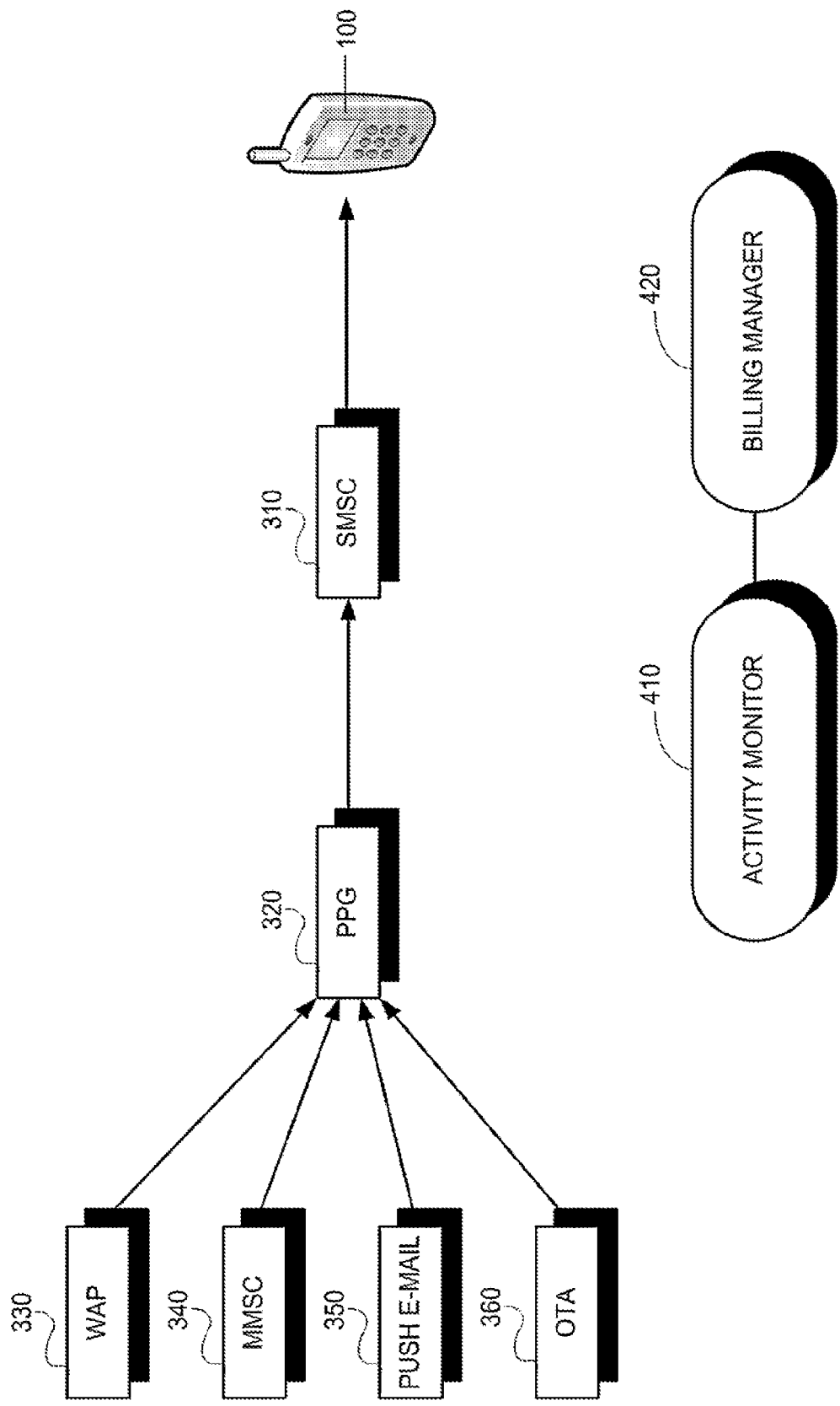
FIG. 6 is a simplified diagram of a wireless communicator that listens for group messages, in accordance with an embodiment of the present invention.

Reference is now made to FIG. 6, which is a simplified diagram of a wireless communicator that listens for group messages, in accordance with an embodiment of the present invention. Shown in FIG. 6 are a Short Messaging Service Center (SMSC) 310, a Push Proxy Gateway (PPG) 320, a WAP Push server 330, a Multimedia Message Service Center (MMSC) 340, a Push E-mail server 350, and an OTA server 360. Messages sent via MAP (Mobile Application Part of the SS7 Protocol) operations generally include a designated port within their metadata. As such, in an implementation of the present invention, mobile communicator 100 listens to the designated port.

In reading the above description, persons skilled in the art will appreciate that there are many apparent variations that can be applied to the methods and systems described. One such variation is the algorithm used for circulating a message so that it traverses an entire group. The algorithm illustrated in FIGS. 1, 2, 3A and 3B corresponds to an ordered list, but other algorithms may be used instead. For example, with large groups it is of advantage to use a tree traversal such as a binary tree traversal, wherein each mobile communicator that receives the message forwards it to two members of the group. When the bottom nodes of the tree receive the message, they send a confirmation back to the parent, which then travels upwards through the tree back to the initiator of the message. With a large group of, say, 1,000 members, the binary tree traversal requires 10 levels of message forwarding down through the tree, and 10 levels of confirmation forwarding back up through the tree. In distinction, an ordered list requires 1,000 sequential message transmissions. Similarly, other graph traversal algorithms may also be used with the present invention.

Another such variation to the methods and systems described herein is to send a message from the initiator of the message directly to all other members of the group, and to enable the operator of the messaging service to allocate the cost equally among the members of the group, either on a per message basis, or an a monthly subscription plan. In accordance with an embodiment of the present invention, the operator uses an activity monitor 410 (FIG. 6) to identify a message distributed to members of a group, and to further identify all transmissions of the distributed message from one member of the group to another. The operator further uses a billing manager 420 to allocate the cost of all of the identified transmissions equally among the members of the group.

Figure 7:
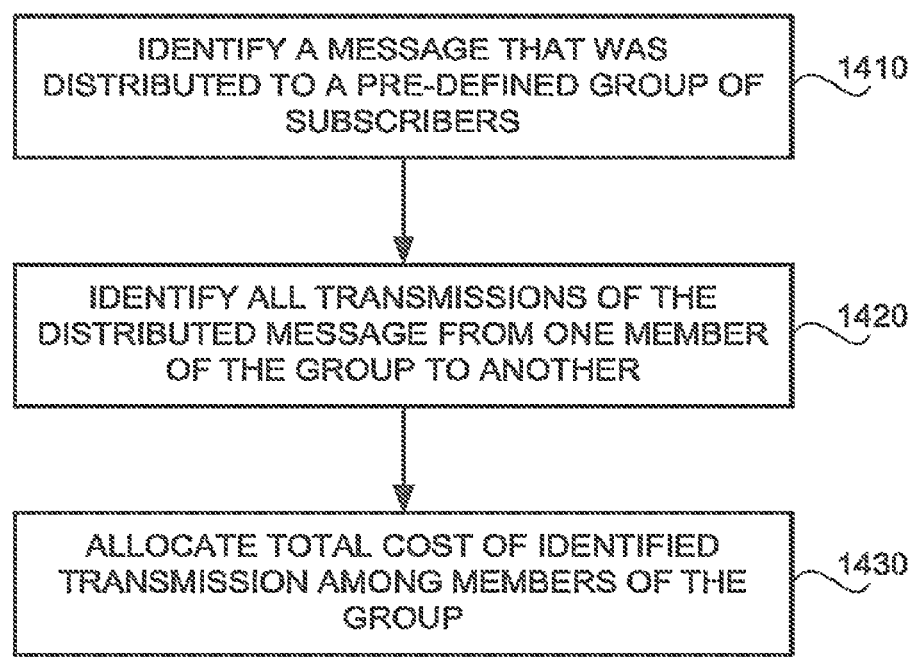
FIG. 7 is a simplified flowchart of a method for allocating the cost of distributing a message to members of a group, among the members, in accordance with an embodiment of the present invention.

Reference is now made to FIG. 7, which is a simplified flowchart of a method for allocating the cost of distributing a message to members of a group, among the members, in accordance with an embodiment of the present invention. The method of FIG. 7 is performed by an operator of the messaging service used by mobile communicators. At step 1410 a monitor, such as activity monitor 410, identifies a message that was distributed among a pre-determined group of subscribers. At step 1420 the monitor identifies all transmissions of the distributed message from one member of the group to another member, as the distributed message traversed all members of the group. At step 1430 a billing system, such as billing manager 420, allocates the cost of all of the identified transmissions among members of the group.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for circulating a message to a group of people, comprising:
being instructed to send a message to a defined destination group of multiple mobile communicators;
in response to said being instructed, sending the message and a distribution list comprising identifiers for all but a selected first one of the group of mobile communicators, to the selected first mobile communicator; and
sequentially receiving the message and a distribution list, by a next mobile communicator, and, if the received distribution list is non-empty, then (i) selecting a next one of the mobile communicators identified in the distribution list, (ii) reducing the size of the distribution list by removing the identifier of the selected next mobile communicator therefrom, and (iii) sending the message and the reduced distribution list to the selected next mobile communicator.

2. The method of claim 1 wherein said selecting the next one of the mobile communicators comprises randomly selecting one of the mobile communicators identified in the distribution list.

3. A communication system for circulating a message to a group of people, comprising:
a plurality of mobile communicators; and
circuitry in each of said mobile communicators, (i) for being instructed to send a message to a defined destination group of multiple mobile communicators, (ii) for sending, in response to the being instructed, the message and a distribution list comprising identifiers for all but a selected first one of the group of mobile communicators, to the selected first mobile communicator, and (iii) for successively receiving the message and a distribution list, by a next mobile communicator, and, if the received distribution list is non-empty, then (iii.a) selecting a next one of the mobile communicators identified in the distribution list, (iii.b) reducing the size of the distribution list by removing the identifier of the selected next mobile communicator therefrom, and (iii.c) sending the message and the reduced distribution list to the selected next mobile communicator.

4. The communication system of claim 3 wherein said circuitry randomly selects the next one of the mobile communicators identified in the distribution list.

5. The method of claim 1, further comprising:
sending an invitation from an originator one of the plurality of mobile communicators to other mobile communicators;
receiving responses from the other mobile communicators, the responses indicating acceptance or non-acceptance of the invitation; and
creating the distribution list, comprising identifying the mobile communicators from which responses indicating acceptance of the invitation were received.

6. The method of claim 1 wherein the identifiers of the mobile communicators in the distribution list comprise phone numbers of the mobile communicators.

7. The method of claim 1 wherein the identifiers of the mobile communicators in the distribution list comprise pointers to phone numbers of the mobile communicators.

8. The communication system of claim 3, wherein said circuitry in each of said mobile communicators, (i) sends an invitation from such mobile communicator to other mobile communicators, (ii) receives responses from the other mobile communicators, the responses indicating acceptance or non-acceptance of the invitation, and (iii) creates the distribution list by identifying the mobile communicators from which responses indicating acceptance of the invitation were received.

9. The communication system of claim 8 wherein the identifiers of said mobile communicators comprise phone numbers of the mobile communicators.

10. The communication system of claim 8 wherein the identifiers of said mobile communicators comprise pointers to phone numbers of the mobile communicators.

11. The method of claim 1, further comprising allocating the total cost of sending the message among the destination group of mobile communicators.

12. The method of claim 1 wherein the message is an SMS message, a MMS message, an e-mail message, or a voice message.

13. The communication system of claim 3, further comprising a billing manager for allocating the total cost of circulating sending the message among the destination group of mobile communicators.

14. The communication system of claim 3 wherein the message is an SMS message, a MMS message, an e-mail message, or a voice message.

* * * * *